United States Patent
Tenney et al.

(10) Patent No.: US 7,070,710 B1
(45) Date of Patent: Jul. 4, 2006

(54) CHEMICAL COMPOSITION AND METHOD

(75) Inventors: Joel Tenney, Marietta, GA (US);
Gunilla Jadesjö, Kungälv (SE); Cecilia Bojrup Andresen, Surte (SE)

(73) Assignee: Eka Chemicals Inc., Marietta, GA (US)

( * ) Notice: Subject to any disclaimer, the term of this patent is extended or adjusted under 35 U.S.C. 154(b) by 658 days.

(21) Appl. No.: 09/390,321

(22) Filed: Sep. 7, 1999

Related U.S. Application Data

(63) Continuation-in-part of application No. 09/330,074, filed on Jun. 11, 1999, now abandoned.

(51) Int. Cl.
*C01B 11/02* (2006.01)

(52) U.S. Cl. ............. 252/186.28; 252/186.29; 252/187.31; 252/187.21; 423/478

(58) Field of Classification Search ........... 423/478; 252/186.27, 186.28, 186.29, 187.31, 187.21
See application file for complete search history.

(56) References Cited

U.S. PATENT DOCUMENTS

| | | | | |
|---|---|---|---|---|
| 2,332,181 A | | 10/1943 | Soule | 23/152 |
| 2,624,655 A | * | 7/1953 | Greenspan | 423/272 |
| 2,833,624 A | * | 5/1958 | Sprauer | 423/478 |
| 4,155,709 A | * | 5/1979 | Doerr | 8/627 |
| 4,534,952 A | | 8/1985 | Rapson | 423/478 |
| 5,273,733 A | * | 12/1993 | Winters et al. | 423/477 |
| 5,366,714 A | * | 11/1994 | Bigauskas | 423/478 |
| 5,376,350 A | | 12/1994 | Tenney et al. | 423/478 |

FOREIGN PATENT DOCUMENTS

| | | |
|---|---|---|
| CA | 2307818 | 5/2000 |
| WO | 93/21105 | 10/1993 |

OTHER PUBLICATIONS

Derwent Publications Ltd., Abstract XP002901285 of JP 2160606.

* cited by examiner

*Primary Examiner*—Ngoc-Yen Nguyen
(74) *Attorney, Agent, or Firm*—White, Redway & Brown LLP

(57) ABSTRACT

The invention relates to a novel composition useful as a feed at production of chlorine dioxide, said composition being an aqueous solution comprising from about 1 to about 6.5 moles/liter of alkali metal chlorate, from about 1 to about 7 moles/liter of hydrogen peroxide and at least one of a protective colloid, a radical scavenger or a phosphonic acid based complexing agent, wherein the pH of the aqueous solution is from about 1 to about 4. The invention also concerns a process for producing chlorine dioxide using the novel composition.

32 Claims, No Drawings

CHEMICAL COMPOSITION AND METHOD

This is a continuation-in-part of application Ser. No. 09/330,074 filed Jun. 11, 1999, now abandoned.

FIELD OF THE INVENTION

The present invention relates to a composition containing alkali metal chlorate, hydrogen peroxide and at least one of a protective colloid, a radical scavenger or a phosphonic acid based complexing agent, and a process for producing chlorine dioxide using said composition as a feed.

BACKGROUND OF THE INVENTION

Chlorine dioxide is primarily used in pulp bleaching, but there is a growing interest of using it also in other applications such as water purification, fat bleaching or removal of organic materials from industrial wastes. Since chlorine dioxide is not storage stable it must be produced on-site.

Production of chlorine dioxide in large scale is usually performed by reacting alkali metal chlorate or chloric acid with a reducing agent and recovering chlorine dioxide gas. Such processes are described in, for example, U.S. Pat. No. 5,091,166, 5,091,167 and 5,366,714, and EP patent 612886.

Production of chlorine dioxide in small scale, such as for water purification applications, can also be done from alkali metal chlorate and a reducing agent but requires somewhat different processes, such as those described in U.S. Pat. No. 5,376,350 and 5,895,638.

The above small scale processes include feeding alkali metal chlorate, hydrogen peroxide and a mineral acid to a reactor, in which chlorate ions are reduced to form chlorine dioxide. In these processes it has now been found favourable to use a premixed solution of alkali metal chlorate and hydrogen peroxide as a feed. However, such solutions are not storage stable, particularly due to decomposition of hydrogen peroxide, but there is also a risk for a reaction between the hydrogen peroxide and the chlorate to form chlorine dioxide. The decomposition of hydrogen peroxide is particularly rapid in the presence of ferrous- and/for chromium ions, which may be introduced as in impurity in alkali metal chlorate or be released from storage containers of steel.

SUMMARY OF THE INVENTION

It is an object of the present invention is to provide a storage stable aqueous mixture of alkali metal chlorate and hydrogen peroxide that can be safely transported.

It is another object of the invention to provide a process for producing chlorine dioxide, particularly in small scale, using such a mixture as a feed.

It has surprisingly been found possible to meet these objects by a new composition being an aqueous solution comprising from about 1 to about 6.5 moles/liter, preferably from about 3 to about 6 moles/liter of alkali metal chlorate, from about 1 to about 7 moles/liter, preferably from about 3 to about 5 mols/liter of hydrogen peroxide and at least one of a protective colloid, a radical scavenger or a phosphonic acid based complexing agent, wherein the pH of the aqueous solution is from about 1 to about 4, preferably from about 1.5 to about 3.5, most preferably from about 2 to about 3. Preferably, at least one phosphonic acid based complexing agents is present, preferably in an amount from about 0.1 to about 5 mmoles/liter, most preferably from about 0.5 to about 3 mmoles/liter. If a protective colloid is present, its concentration is preferably from about 0.001 to about 0.5 moles/liter, most preferably from about 0.02 to about 0.05 moles/liter. If a radical scavenger is present, its concentration is preferably from about 0.01 to about 1 mol/liter, most preferably from about 0.02 to about 0.2 moles/liter. The water content in the composition is suitably from about 20 to about 70 wt %, preferably from about 30 to about 60 wt %, most preferably from about 40 to about 55 wt %.

It has also surprisingly been found that the performance of a small scale process for producing chlorine dioxide is improved is such a composition is used as a feed. Thus, the invention also relates to a preferably-continuous process for producing chlorine dioxide comprising the steps of:

(a) feeding an aqueous solution comprising alkali metal chlorate, hydrogen peroxide and at least one of a protective colloid, a radical scavenger or a phosphonic acid based complexing agent as specified above and a mineral acid, or a mixture thereof, to a reactor to form an aqueous reaction mixture;

(b) reacting chlorate ions with hydrogen peroxide in said reaction mixture to form chlorine dioxide; and (c) recovering a product containing chlorine dioxide.

DETAILED DESCRIPTION OF PREFERRED EMBODIMENTS

As high pH favours decomposition of hydrogen peroxide, while low pH favours formation of chlorine dioxide, ft has unexpectedly been found that both can be avoided by selecting the above pH range. The pH is affected, inter alia, by the amount of hydrogen peroxide and by the protective colloid, radical scavenger or complexing agent used. If necessary, the pH of the aqueous solution can be adjusted to a suitable level by adding small amounts of any acid or alkaline substance compatible with hydrogen peroxide and chlorate, such as $Na_4P_2O_7$, or $H_8PO_4$.

Any phosphonic acid based complexing agent can be used. Particularly preferred compositions comprise at least one phosphonic acid based complexing agent selected from the group consisting of 1-hydroxyethylidene-1,1-diphosphonic acid, 1-aminoethane-1,1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid), diethylenetriamine hexa (methylenephosphonic acid), and 1-aminoalkane-1,1-diphosphonic acids such as morpholinomethane diphosphonic acid, N,N-dimethyl aminodimethyl diphosphonic acid, aminomethyl diphosphonic acid, or salts thereof, preferably sodium salts.

Useful protective colloids include tin compounds, such as alkali metal stannate, particularly sodium stannate ($Na_2(Sn(OH)_6)$). Useful radical scavengers include pyridine carboxylic acids, such as 2,6-pyridine dicarboxylic acid. It is to be understood that the composition of the invention can include mixtures of two or more of at least one protective colloids, at least one radical scavenger and at least one phosphonic acid based complexing agent.

In the aqueous solution of the new composition the molar ratio $H_2O_2$ to $ClO_3$ suitably is from about 0.2:1 to about 2:1, preferably from about 0.5:1 to about 1.5:1, most preferably from about from about 0.5:1 to about 1:1. Using a composition of this ratio for producing chlorine dioxide has been found to give high conversion of the chlorate.

In order to inhibit corrosion, the composition further preferably contains a nitrate salt, preferably alkali metal nitrate such as sodium nitrate, in a preferred amount from about 1 to about 10 mmoles/liter, and a most preferred amount from about 4 to about 7 mmoles/liter.

It is also preferred that the amount of chloride ions is as low as possible, preferably below about 0.5 mmoles/liter, most preferably below about 0.1 mmoles/liter, particularly below about 0.03 mmoles/liter. Too much chloride increases the risk for corrosion, but may also cause formation of chlorine when the composition is used for chlorine dioxide production. As chloride normally is present as an impurity in alkali metal chlorate, it is advisable to use chlorate without extra added chloride, normally containing less than about 0.5, suitably less than about 0.05, preferably less than about 0.02, most preferably less than about 0.01 wt % of alkali metal chloride calculated as NaCl in $NaClO_3$.

The composition normally contains as impurities ions of chromium and iron, particularly $Cr^{3+}$ and $Fe^{2+}$. The presence of these ions increases the decomposition of the hydrogen peroxide, and it is desired to keep their content as low as possible. However, they are inevitably released during storage of the composition in steel containers, and may also be introduced as impurities in the alkali metal chlorate. The content of $Cr^{3+}$ is normally from about 0.5 to about 3 mg/liter, particularly from about 1 to about 2 mg/liter, while the content of $Fe^{2+}$ normally is from about 0.05 to about 5 mg/liter, particularly from about 1 to about 2 mg/liter.

Any alkali metal chlorate can be used, such as sodium, potassium or mixtures thereof, although sodium chlorate is preferred.

Besides the main ingredients discussed above and any unavoidable impurities in the composition, it is preferred that the balance up to 100% is mainly made up of water.

The novel composition may be prepared by simply mixing the ingredients together, for example by dissolving solid alkali metal chlorate in water and adding aqueous solutions of hydrogen peroxide, and at least one of a protective colloid, a radical scavenger or a complexing agent and any other optional substance. Alternatively, solid alkali metal chlorate may be dissolved in an aqueous solution of hydrogen peroxide of suitable concentration, and adding the other components before or after the alkali metal chlorate.

It has been found that a composition as described above is substantially storage stable and can be transported safely. It is also more pleasant to handle for the plant operators as the content of hydrogen peroxide is lower than in normal hydrogen peroxide of technical grade, which generally contains about 50 wt % $H_2O_2$.

In the process for producing chlorine dioxide of the invention, a composition as described above and a mineral acid, preferably sulfuric acid, are used as feed materials. It has been found that when the composition of the invention is used as a feed, it is possible to avoid feeding an unnecessary excess of water and thus obtaining a more concentrated reaction mixture and higher production. It has also been found that the consumption of the mineral acid is lower than if alkali metal chlorate and hydrogen peroxide are fed separately, even if they are premixed before entering the reactor.

In the case sulfuric add is used as a feed, it preferably has a concentration from about 70 to about 96 wt %, most preferably from about 75 to about 85 wt % and preferably a temperature from about 0 to about 100° C. most preferably from about 20 to about 50° C., as it then may be possible to operate the process adiabatically. Preferably from about 2 to about 5 kg $H_2SO_4$, most preferably from about 3 to about 6 kg $H_2SO_4$ is fed per kg 0102 produced. Alternatively, the equivalent amount of another mineral acid may be used.

A preferred process of the invention comprises the steps of (a) feeding a composition as described above and a mineral acid, or a mixture thereof, at one end of a tubular reactor to form a reaction mixture;

(b) reducing chlorate ions in the reaction mixture to in said tubular reactor to form chlorine dioxide, wherein the degree of chlorate conversion to chlorine dioxide in said reactor suitably is from about 75% to 100%, preferably from about 80 to 100%, most preferably from about 95 to 100%; and (c) recovering a product containing chlorine dioxide at the other end of said tubular reactor.

The product recovered is normally an aqueous solution containing chlorine dioxide, oxygen and an alkali metal salt of the mineral acid. It may also contains unreacted chemicals such as mineral acid and small amounts of chlorate ions. However, it has been found possible to avoid any substantial formation of chlorine.

It is preferred to operate without recirculating unreacted chemicals such as chlorate or sulfuric acid from the product back to the reactor. In many applications the complete product mixture can be used without separation, for example in water purification.

It is normally favourable to operate the reactor as a CFSTR (constant flow stirred tank reactor). The reaction mixture in the bulk of the reactor preferably contains from 0 to about 2, most preferably from 0 to about 0.1 moles per liter of chlorate ions, and from about 3 to about 10, most preferably from about 4 to about 6 moles per liter of sulfuric acid. It is preferred to maintain the concentration of chlorate and sulfate below saturation to avoid crystallization of metal salts thereof.

Suitably the pressure in the reactor is from about 17 to about 120 kPa, preferably from about 47 to about 101 kPa, most preferably from about 67 to about 87 kPa. Although normally not necessary, it is possible also to supply extra inert gas such as air. The temperature is preferably maintained from about 30° C. to the boiling point of the reaction mixture, most preferably below the boiling point.

It is preferred that the composition of the invention is substantially uniformly dispersed in the mineral acid at the inlet of the reactor to avoid any substantial radial concentration gradients over the cross section of the reactor. In order to minimize the radial concentration gradients it has been found favourable to use a tubular reactor with a inner diameter from about 25 to about 250 mm, preferably from about 70 to about 130 mm.

The process of the invention is particularly suitably for production of chlorine dioxide in small scale, for example from about 0.1 to about 100 kg/hr, preferably from about 0.1 to about 50 kg/hr in one reactor. For many applications, a suitable chlorine dioxide production rate is from about 0.1 to about 10 kg/hr, preferably from about 0.2 to about 7 kg/hr, most preferably from about 0.5 to about 5 kg/hr in one reactor. It is possible to achieve a high degree of chlorate conversion in a comparatively short reactor, preferably having a length from about 50 to about 500 mm, most preferably from about 100 to about 400 mm. It is particularly favourable to use a tubular reactor having a preferred ratio of the length to the inner diameter from about 12:1 to about 1:1, most preferably from about 4:1 to about 1.5:1. A suitable average residence time in the reactor is from about 1 to about 100 minutes, preferably from about 4 to about 40 minutes.

A small scale production unit normally consist of only one reactor, but it is possible to arrange several, for example up to about 15 or more reactors in parallel, for example as a bundle of tubes.

EXAMPLE 1

A process of the invention was run by continuously feeding 78 wt % $H_2SO_4$ and a composition according to the invention to a tubular reactor having an internal diameter of 100 mm and a length of 300 mm. The composition of the invention was an aqueous solution of 40 wt % $NaClO_3$, 10 wt % $H_2O_2$, and containing diethylene triamin pentaphosphonate (Dequest™ 2066A). The reactor was operated at a pressure of 500 mm Hg (67 kPa), a temperature of 40° C. and produced 5 lb (2.3 kg) ClO2 per hr. As a comparison, a process was run in the same way, with the exception that instead of feeding a composition according to the invention, aqueous solutions of 40 wt % $NaClO_3$ and of 50 wt % $H_2O_2$ were fed separately. As shown in the table below, it was found that by feeding a composition according to the invention less sulfuric acid was required to reach the same conversion degree of chlorate.

| Comp. of Invention | Flow rate (ml/min) | | | $ClO_3^-$ conversion (%) |
|---|---|---|---|---|
| | $NaClO_3$ | $H_2O_2$ | $H_2SO_4$ | |
| | 123 | 33 | 4.75 | 81 |
| | 123 | 33 | 4.29 | 81 |
| | 123 | 33 | 4.41 | 84 |
| | 123 | 33 | 4.51 | 85 |
| | 123 | 33 | 4.53 | 86 |
| | 123 | 33 | 4.77 | 87 |
| | 123 | 33 | 5.26 | 90 |
| | 123 | 33 | 4.61 | 91 |
| | 123 | 33 | 4.65 | 92 |
| | 123 | 33 | 4.92 | 93 |
| | 123 | 33 | 5.1 | 93 |
| | 123 | 33 | 5.42 | 93 |
| | 123 | 33 | 5.22 | 93 |
| | 123 | 33 | 4.84 | 94 |
| 122 | | | 3.3 | 83 |
| 122 | | | 3.31 | 86 |
| 122 | | | 3.42 | 87 |
| 122 | | | 3.48 | 89 |
| 122 | | | 4.45 | 90 |
| 122 | | | 3.8 | 90 |
| 122 | | | 3.68 | 90 |
| 122 | | | 3.56 | 90 |
| 122 | | | 4.29 | 91 |
| 122 | | | 4.16 | 91 |
| 122 | | | 4.04 | 91 |
| 122 | | | 3.86 | 92 |
| 122 | | | 4.78 | 96 |

EXAMPLE 2

A composition according to the invention was prepared by providing an aqueous solution of 40 wt % $NaClO_3$, about 10 wt % $H_2O_2$, and 500 mg/l diethylene triamin pentaphosphonate (Dequest™ 2086A). The pH was adjusted by adding $Na_4P_2O_7$. The prepared solutions contained as impurities 2 mg/i $Fe^{2+}$ and 2 mg/l $Cr^{3+}$. Samples of the solutions were stored in vessels of passivated steel (SS 2343) at 55° C., and the decomposition degree of the hydrogen peroxide was measured after 14 days. For comparative purposes, compositions without diethylene triamin pentaphosphonate were stored in the same way. No chlorine dioxide was formed in any of the samples, but as shown in the table below, the composition of the invention had satisfactory stability, while a substantial amount of the hydrogen peroxide had decomposed in the comparative composition.

| Exp. No. | pH start | wt % $H_2O_2$ start | % $H_2O_2$ Decomp after 14 days |
|---|---|---|---|
| 1 (invention) | 2.1 | 9.8 | 4 |
| 2 (invention) | 3.2 | 9.9 | 5 |
| 3 (comparative) | 2.2 | 9.8 | 55 |
| 4 (comparative) | 3.6 | 9.9 | 84 |

The invention claimed is:

1. Composition useful as a feed at production of chlorine dioxide, said composition being an aqueous solution comprising from about 1 to about 6.5 moles/liter of alkali metal chlorate, from about 1 to about 7 moles/liter of hydrogen peroxide and at least one of a protective colloid, a radical scavenger or a phosphonic acid based complexing agent, wherein the pH of the aqueous solution is from about 1 to about 4.

2. Composition as claimed in claim 1, wherein the aqueous solution comprises at least one phosphonic acid based complexing agent.

3. Composition as claimed in claim 1, wherein the aqueous solution comprises at least one protective colloid.

4. Composition as claimed in claim 1, wherein the aqueous solution comprises at least one radical scavenger.

5. Composition as claimed in claim 2, wherein the aqueous solution comprises from about 0.1 to about 5 mmoles/liter of at least one phosphonic acid based complexing agent.

6. Composition as claimed claim 2, wherein the at least one phosphonic acid based complexing agent is selected from the group consisting of 1-hydroxyethylidene-1,1-diphosphonic acid, 1-aminoethane-1,1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid), diethylenetriamine hexa (methylenephosphonic acid), morpholinomethane diphosphonic acid, N,N-dimethyl aminodimethyl diphosphonic acid, aminomethyl diphosphonic acid, and salts thereof.

7. Composition as claimed claim 5, wherein the at least one phosphonic acid based complexing agent is selected from the group consisting of 1-hydroxyethylidene-1,1-diphosphonic acid, 1-aminoethane-1,1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid), diethylenetriamine hexa (methylenephosphonic add), morpholinomethane diphosphonic acid, N,N-dimethyl aminodimethyl diphosphonic acid, aminomethyl diphosphonic acid, and salts thereof.

8. Composition as claimed in claim 1, wherein the water content is from about 20 to about 70 wt %.

9. Composition as claimed in claim 8, wherein the water content is from about 30 to about 60 wt %.

10. Composition as claimed in claim 1, wherein the aqueous solution comprises from about 1 to about 10 mmoles/liter of alkali metal nitrate.

11. Composition as claimed claim 1, wherein the content of chloride ions in the aqueous solution is less than 0.5 mmoles/liter.

12. Composition as claimed claim 1, wherein the molar ratio of $H_2O_2$ to $ClO_3$ in the aqueous solution is from about 0.2:1 to about 2:1.

13. Composition as claimed claim 1, wherein the aqueous solution comprises from about 3 to about 6 moles/liter of alkali metal chlorate, from about 3 to about 5 moles/liter of hydrogen peroxide and from about 0.5 to about 3 mmoles/liter of at least one phosphonic acid based complexing agent.

14. Composition as claimed claim 1, wherein the pH of the aqueous solution is from about 1.5 to about 3.5.

15. Composition as claimed in claim 3, wherein the at least one protective colloid is a tin compound.

16. Composition as claimed in claim 15, wherein the tin compound is alkali metal stannate.

17. Composition as claimed in claim 4, wherein the at least one radical scavenger is a pyridine carboxylic acid.

18. Composition as claimed in claim 17, wherein the pyridine carboxylic acid is 2,6-pyridine carboxylic acid.

19. Composition as claimed in claim 5, wherein the aqueous solution comprises from about 0.5 to about 3 mmoles/liter of at least one phosphonic acid based complexing agent.

20. Composition as claimed in claim 3 comprising from about 0.001 to about 0.5 moles/liter of at least one protective colloid.

21. Composition as claimed in claim 4 comprising from about 0.01 to about 1 mole/liter of at least one radical scavenger.

22. Composition as claimed in claim 6, wherein the at least one phosphonic acid based complexing agent comprises diethylene triamine penta(methylene phosphonic acid) or a salt thereof.

23. Composition as claimed in claim 6, wherein the at least one phosphonic acid based complexing agent comprises aminotri(methylenephosphonic acid) or a salt thereof.

24. Composition as claimed in claim 6, wherein the at least one phosphonic acid based complexing agent comprises 1-hydroxyethylidene-1,1-diphosphonic acid or a salt thereof.

25. Composition as claimed in claim 1, wherein the composition is storage stable for at least fourteen days.

26. Composition useful as a feed for production of chlorine dioxide, said composition being an aqueous solution comprising from about 1 to about 6.5 moles/liter of alkali metal chlorate, from about 1 to about 7 moles/liter of hydrogen peroxide and at least one of from about 0.001 to about 0.5 moles/liter alkali metal stannate, from about 0.01 to about 1 mole/liter of a pyridine carboxylic acid or from about 0.1 to about 5 mmoles/liter of a phosphonic acid based complexing agent, wherein the pH of the aqueous solution is from about 1 to about 4 and the molar ratio of $H_2O_2$ to $ClO_3^-$ is from about 0.2:1 to about 2:1.

27. Composition useful as a feed for production of chlorine dioxide, said composition being an aqueous solution comprising from about 1 to about 6.5 moles/liter of alkali metal chlorate, from about 1 to about 7 moles/liter of hydrogen peroxide and from about 0.1 to about 5 mmoles/liter of at least one phosphonic acid based complexing agent, wherein the pH of the aqueous solution is from about 1 to about 3.5 and the molar ratio of $H_2O_2$ to $ClO_3^-$ is from about 0.2:1 to about 2:1.

28. A storage vessel containing a composition useful as a feed for production of chlorine dioxide, said composition being an aqueous solution comprising from about 1 to about 6.5 moles/liter of alkali metal chlorate, from about 1 to about 7 moles/liter of hydrogen peroxide and from about 0.1 to about 5 mmoles/liter of at least one phosphonic acid based complexing agent, wherein the pH of the aqueous solution is from about 1 to about 3.5 and the molar ratio of $H_2O_2$ to $ClO_3^-$ is from about 0.2:1 to about 2:1, and wherein said composition has a rate of $H_2O_2$ decomposition, measured from the time of forming said composition, of no more than 5% in fourteen days.

29. Composition as claimed in claim 1, wherein the content of alkali metal chloride in the composition is less than 0.5 wt % calculated as NaCl in $NaClO_3$.

30. Composition as claimed in claim 26, wherein the content of alkali metal chloride in the composition is less than 0.5 wt % calculated as NaCl in $NaClO_3$.

31. Composition as claimed in claim 27, wherein the content of alkali metal chloride in the composition is less than 0.5 wt % calculated as NaCl in $NaClO_3$.

32. Composition as claimed in claim 9, wherein the water content is from about 40 to about 55 wt %.

\* \* \* \* \*